United States Patent
Ho et al.

(10) Patent No.: US 6,937,794 B2
(45) Date of Patent: Aug. 30, 2005

(54) USING A TRANSVERSAL FILTER TO COMPENSATE FOR DISPERSION

(75) Inventors: Yen-Ping Ho, San Jose, CA (US); Michel E. Marhic, San Francisco, CA (US); Eugenia D. Eugenieva, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 10/409,287

(22) Filed: Apr. 8, 2003

(65) Prior Publication Data

US 2004/0202419 A1 Oct. 14, 2004

(51) Int. Cl.$^7$ .............................. G02B 6/34; H04J 14/02
(52) U.S. Cl. ............................ 385/37; 385/14; 385/31; 385/129; 385/130
(58) Field of Search ............................... 385/37, 14, 15, 385/42, 24, 129–131, 123, 130, 132, 1, 2, 3; 398/81, 84

(56) References Cited

U.S. PATENT DOCUMENTS

| | | | | |
|---|---|---|---|---|
| 5,530,778 A | * | 6/1996 | Rast ............................. | 385/24 |
| 5,745,613 A | * | 4/1998 | Fukuchi et al. ............... | 385/24 |
| 5,793,907 A | * | 8/1998 | Jalali et al. .................... | 385/24 |
| 5,867,293 A | * | 2/1999 | Kotten ........................ | 398/149 |

* cited by examiner

*Primary Examiner*—Brian M. Healy
(74) *Attorney, Agent, or Firm*—Trop, Pruner & Hu, P.C.

(57) ABSTRACT

An arrayed waveguide grating may include a transversal filter to compensate for dispersion. The characteristics of each of the waveguides making up the waveguide region of the arrayed waveguide grating can be adjusted to achieve the desired compensation.

18 Claims, 1 Drawing Sheet

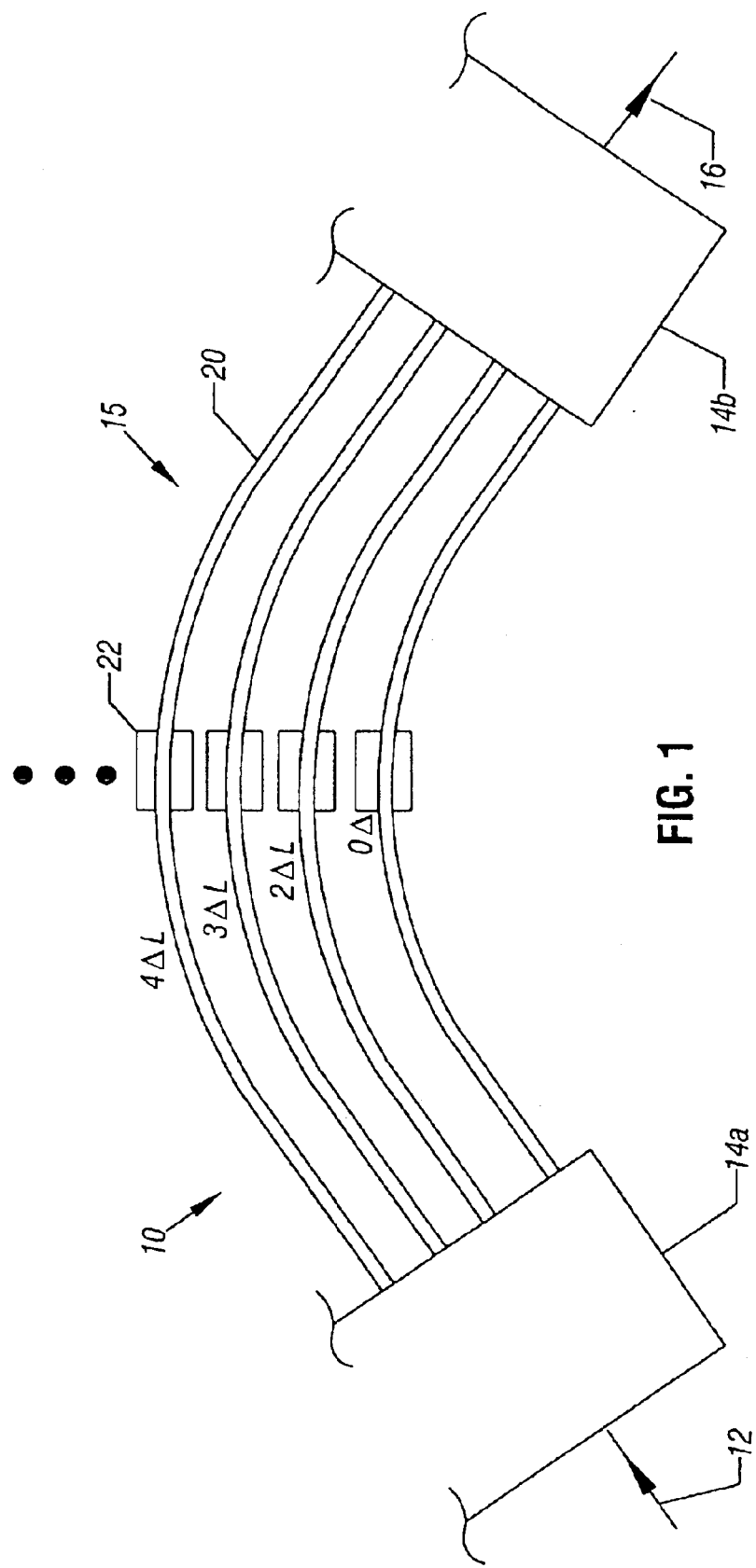

USING A TRANSVERSAL FILTER TO COMPENSATE FOR DISPERSION

BACKGROUND

This invention relates generally to optical communication networks.

Optical communication networks may be subject to dispersion, which is the dependence of the refractive index of a medium on the wavelength of light traveling through the medium. Thus, dispersion involves changing the light velocity inside the medium, depending on its wavelength.

An optical network's velocity dependence on wavelength results in pulse spread. Dispersion restricts the information carrying capacity of a waveguide since, the wider the pulse, the fewer pulses that can be accommodated per interval, resulting in a smaller bit rate.

Lattice filters may be used as dispersion-compensators. While lattice filters can, in principle, implement any transfer function without any insertion loss, the fact that they use many tunable 2×2 couplers in series leads to a high insertion loss in practical lattice filters.

As the transmission speed of telecommunication networks has steadily increased, compensating the chromatic dispersion that data signals experience during transmission through optical fibers and other optical components has become an increasingly important issue. Chromatic dispersion has a direct impact on how far signals can be transmitted without error, with transmission distance scaling inversely with the square of transmission bandwidth. It has long been recognized that there will be an increasingly strong need for devices that can flexibly and accurately compensate for this chromatic dispersion.

Thus, there is a need for better ways to compensate for dispersion.

BRIEF DESCRIPTION OF THE DRAWINGS

FIG. 1 is a schematic depiction of one embodiment of the present invention.

DETAILED DESCRIPTION

Referring to FIG. 1, a planar light circuit (PLC) may be formed on a substrate using conventional semiconductor fabrication techniques. An arrayed waveguide grating 10 may include an input waveguide 12, a star coupler 14a, a waveguide region 15, an output star coupler 14b, and an output waveguide 16. As indicated, the input signal may include a plurality of channels, each of a different wavelength as part of a wavelength division multiplexed optical network.

The waveguide section 15 may act as a transversal filter. While a transversal filter approach may suffer from a finite intrinsic insertion loss, overall losses may be comparable to or even better than that of a lattice filter because there may be fewer couplers in each path.

Transversal filters may also potentially be implemented without 2×2 couplers, using diffraction and waveguide splitting to couple the desired amounts of light into a set of waveguides. This implementation can then be viewed as a particular form of arrayed waveguide grating (AWG).

In any case, desired weights for the wave, and path length differences between the waveguides 20, are used to design the transversal filter. The procedure is to use a phase-only function, and to specify the phase as a cosine (or sine) function. For wavelength division multiplexing (WDM) systems, the period of the filter may match that of the wavelength spectrum. The target transfer function is of the form:

$$F(f) = \exp\left[i\varepsilon\pi \cos\left(2\pi \frac{f}{f_{FSR}}\right)\right] \quad (1)$$

where: f is the frequency; $f_{FSR}$ is the free spectral range (i.e. period) of the filter; $\varepsilon$ is a parameter determining the amplitude of the phase modulation ($\varepsilon$ typically ranges between −1 and 1). With this choice, the relative group delay is:

$$\tau(f) = -\frac{1}{2\pi}\frac{d}{df}[arg(F(f))] = \frac{\varepsilon\pi}{f_{FSR}}\sin\left(2\pi \frac{f}{f_{FSR}}\right) \quad (2)$$

Near f=0, $\tau(f)$ is a linear function of f, and its slope is proportional to the chromatic dispersion $$D = \frac{d\tau}{d\lambda}$$

of the filter, where $\lambda$ is the wavelength. Using $$d\lambda = \frac{\lambda^2}{c}df,$$

we find that:

$$D = 10^3 \varepsilon \frac{2\pi^2}{c}\left(\frac{\lambda}{\lambda_{FCR}}\right)^2 (ps/nm) \quad (3)$$

where: $\lambda_{FSR}$ is the filter period (with the same units as $\lambda$); c=3×10⁸ m/s.

The chromatic dispersion (D) decreases strongly as the filter period ($\lambda_{FSR}$) increases. Hence, this type of filter is more effective for small filter periods ($\lambda_{FSR}$). As an example, if $\lambda_{FSR}$=0.5 nm, chromatic dispersion (D) on the order of 800 ps/nm can be compensated in some embodiments. This corresponds to about 50 km of standard single-mode fiber operated at 1550 nm, with a chromatic dispersion coefficient of about 17 ps/nm/km.

Since F(f) is periodic, it can be expanded in a Fourier series. For simplicity the angle $\theta$ is equal to $$2\pi \frac{f}{f_{FSR}},$$

which varies by $2\pi$ over a free spectral range.
Then $$G(\theta) = F(f) = \sum_{n=-\infty}^{\infty} a_n \exp(in\theta) = \sum_{n=-\infty}^{\infty} i^n J_n(\varepsilon\pi)\exp(in\theta) \quad (4)$$

where $J_n$ is the Bessel function of order n. Eq. (4) shows that the Fourier coefficients are:

$$a_n = i^n J_n(\varepsilon\pi) \quad (5)$$

In a PLC filter, G(θ) is approximated by truncating the series at some integer N.

In a transversal filter implementation of FIG. 1, each exponential term in the series may be implemented by means of a parallel waveguide 20 of suitable length, carrying a wave whose amplitude is related to the Fourier coefficients.

Thus, $$0 = 2\pi f \Delta\tau = 2\pi f \frac{n_{eff} \Delta L}{c} = 2\pi \frac{f}{f_{FSR}} \quad (6)$$

where Δτ and ΔL are the propagation delay and length differences between adjacent waveguides 20, and $n_{eff}$ is the effective index of the waveguides 20. This leads to a distance between adjacent waveguides 20 of:

$$\Delta L = \frac{c}{n_{eff} f_{FSR}} \quad (7)$$

As an example, if we assume that $f_{FSR}$=50 GHz and $n_{eff}$=1.5, then ΔL=4 mm. Thus, if N=5, i.e., eleven waveguides 20 in parallel, there will be a 4 cm difference in length between the most spaced apart waveguides 20.

There are several ways to choose the field amplitudes in the waveguides 20 in order to obtain the same transfer function. The most energy-efficient way is to have symmetric coupling into and out of the waveguide array, with weights that are not equal to each other, but are related to the Fourier coefficients.

Specifically, the amplitude transmission coefficient from the input waveguide 12 to the nth waveguide 20 in the array may be proportional to:

$$u_n = \sqrt{|a_n|} = \sqrt{|J_n(\epsilon\pi)|} \quad (8)$$

The transmittance (ratio of powers) from the input waveguide 12 to the nth waveguide 20 in the array is $(u_n)^2 = |a_n| = |J_n(\epsilon\pi)|$.

For ϵ=1:

$(u_0)^2 = |a_0| = |J_0(\pi)| = 0.304$ $(u_1)^2 = (u_{-1})^2 = |a_1| = |a_{-1}| = |J_1(\pi)| = 0.285$ $(u_2)^2 = (u_{-2})^2 = |a_2| = |a_{-2}| = |J_2(\pi)| = 0.485$ $(u_3)^2 = (u_{-3})^2 = |a_3| = |a_{-3}| = |J_3(\pi)| = 0.151$ $(u_4)^2 = (u_{-4})^2 = |a_4| = |a_{-4}| = |J_4(\pi)| = 0.052$

The first four coefficients are not very different, and it might be possible to implement them by varying the input (and output) widths of the guides 20, so that they will capture the desired amount of light. This part of the design may also take into account the spatial distribution of the radiation pattern of the light emerging from the input guide 12 in some embodiments.

On the other hand, the fifth term is quite a bit smaller (almost ten times smaller than the third one), and may be more difficult to implement. Since it is so small, it probably does not contribute much to the accuracy of the transfer function and may be omitted, at least in a first implementation.

Note that $J_0(\pi)$ is negative, but that the other four terms are positive. The proper phases for the Fourier coefficients (including those due to $i^n$ in Eq. (5)) may be accounted for by means of sub-wavelength path differences, that, in one embodiment, may be adjustable by means of thermal pads 22.

Due to the nature of a transversal filter, there is an inevitable loss associated with this arrangement. For N=4, and ϵ=1, the loss is about 9 dB.

In addition, one may consider other possible sources of loss, such as waveguide loss, as well as excess loss associated with coupling from the input waveguide 12 to the arrayed waveguides 20 (and vice-versa at the output 16). The latter is due to the fact that the fundamental mode in each guide 20 has a nearly-Gaussian shape, while the incident field profile is nearly uniform over the guide area. This uniform profile leads to a coupling efficiency of less than one.

Thus, in some embodiments, different waveguides 20 may have different power coupling to control the amplitude of the output signal. Similarly, each waveguide 20 may have different lengths L to control the phase. As a result, the amplitude and phase of each signal can be adjusted to compensate for dispersion.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

using an arrayed waveguide grating to act as a transversal filter to compensate for dispersion in an optical device.

2. The method of claim 1 including using a planar lightwave circuit acting as a transversal filter.

3. The method of claim 1 including adjusting the length of an array of waveguides to compensate for dispersion.

4. The method of claim 1 including adjusting the length of a waveguide to alter the phase of a signal.

5. The method of claim 1 including adjusting power coupling to control the amplitude of a signal.

6. The method of claim 4 including varying the lengths between said waveguides.

7. The method of claim 6 including varying the lengths between said waveguides as a function of the effective index of the waveguides.

8. The method of claim 6 including heating at least one of said arrayed waveguides.

9. The method of claim 6 including adjusting for sub-wavelength path differences.

10. An optical device comprising:

an optical element subject to dispersion; and an arrayed waveguide grating that acts as a dispersion compensating transversal filter coupled to said element to compensate for dispersion of said element.

11. The device of claim 10 wherein said transversal filter is formed as a planar lightwave circuit.

12. The device of claim 10 wherein the lengths of the array of waveguides in said arrayed waveguide grating are adjusted to compensate for dispersion.

13. The device of claim 12 wherein the lengths of the array of waveguides are adjusted to alter the phase of a signal.

14. The device of claim 12 including a heater to heat at least one of said waveguides.

15. An optical device comprising:
a substrate; and
an arrayed waveguide grating formed in said substrate, said waveguide grating including a pair of couplers and a waveguide region including a plurality of waveguides, the lengths of said waveguide gratings being adjusted to compensate for dispersion of a signal incident to said device.

16. The device of claim 15 wherein the lengths of said waveguide gratings are adjusted to alter the phase of the signal incident to said device.

17. The device of claim 15 including a heater to heat at least one of said waveguide gratings.

18. The device of claim 17 including a heater for each of said waveguide gratings.

* * * * *